(12) United States Patent
Lei (10) Patent No.: US 8,406,486 B2
(45) Date of Patent: Mar. 26, 2013

(54) INTER-PATTERN FEATURE CORRESPONDING DEVICE, INTER-PATTERN FEATURE CORRESPONDING METHOD USED FOR THE SAME, AND PROGRAM THEREFOR

(75) Inventor: Huang Lei, Tokyo (JP)

(73) Assignee: NEC Corporation, Tokyo (JP)

( * ) Notice: Subject to any disclaimer, the term of this patent is extended or adjusted under 35 U.S.C. 154(b) by 462 days.

(21) Appl. No.: 12/809,287

(22) PCT Filed: Dec. 19, 2008

(86) PCT No.: PCT/JP2008/073204
§ 371 (c)(1),
(2), (4) Date: Jun. 18, 2010

(87) PCT Pub. No.: WO2009/081866
PCT Pub. Date: Jul. 2, 2009

(65) Prior Publication Data
US 2011/0200261 A1  Aug. 18, 2011

(30) Foreign Application Priority Data
Dec. 26, 2007  (JP) .................................. 2007-333390

(51) Int. Cl.
*G06K 9/00* (2006.01)
*G06K 9/46* (2006.01)
*G06K 9/66* (2006.01)
*G06K 9/62* (2006.01)

(52) U.S. Cl. ........ 382/125; 382/124; 382/190; 382/215; 382/216

(58) Field of Classification Search ........................ None
See application file for complete search history.

(56) References Cited

U.S. PATENT DOCUMENTS
5,613,014 A * 3/1997 Eshera et al. ................. 382/124
(Continued)

FOREIGN PATENT DOCUMENTS
JP      59-778 A      1/1984
(Continued)

OTHER PUBLICATIONS

Bebis et al., "Fingerprint identification using Delaunay triangulation", Information Intelligence and Systems, 1999. Proceedings. 1999 International Conference on; p. 452-459.*

(Continued)

*Primary Examiner* — Tom Y Lu
*Assistant Examiner* — Thomas Conway (57) ABSTRACT

To provide an inter-pattern feature corresponding device (1) for determining a feature correspondence relationship with high accuracy even if a pattern to be collated has distortion. The inter-pattern feature corresponding device (1) includes a means (11) for generating a proximity feature point group in which the feature points are positionally proximate to each other in a pattern and a location relationship numeric number group indicating the location relationship between the feature points of the proximity feature point group as feature point group locations, a means (12) for comparing the generated location relationship numeric numbers to detect the corresponding feature point group location candidates, a means (13) for comparing the location relationship numeric numbers between a feature point of each feature point group location of the corresponding feature point group location candidates and feature points which are proximate to the feature point group locations, adding the corresponding proximity feature points to the corresponding feature point group location candidates, and updating the corresponding feature point group location candidates, a means (14) for examining the associated corresponding feature point candidates of the updated corresponding feature point group location candidates to set the associated corresponding feature points of the corresponding feature point group location candidates, and a means (15) for examining the corresponding feature point group location candidates to set inter-pattern corresponding feature points.

17 Claims, 9 Drawing Sheets

U.S. PATENT DOCUMENTS

| | | | |
|---|---|---|---|
| 6,041,133 A * | 3/2000 | Califano et al. | 382/124 |
| 6,330,347 B1 * | 12/2001 | Vajna | 382/125 |
| 6,778,687 B2 * | 8/2004 | Sanders et al. | 382/125 |
| 7,349,559 B2 * | 3/2008 | Miyasaka | 382/124 |
| 7,840,034 B2 * | 11/2010 | Takahashi et al. | 382/116 |
| 2005/0084143 A1 * | 4/2005 | Kramer et al. | 382/125 |

FOREIGN PATENT DOCUMENTS

| | | |
|---|---|---|
| JP | 6-103366 A | 4/1994 |
| JP | 10-240932 A | 9/1998 |
| JP | 11-110542 A | 4/1999 |
| JP | 11-195119 A | 7/1999 |

OTHER PUBLICATIONS

International Search Report for PCT/JP2008/073204 mailed Jan. 27, 2009.

* cited by examiner

INTER-PATTERN FEATURE CORRESPONDING DEVICE, INTER-PATTERN FEATURE CORRESPONDING METHOD USED FOR THE SAME, AND PROGRAM THEREFOR

TECHNICAL FIELD

The present invention relates to an inter-pattern feature corresponding device, an inter-pattern feature corresponding method used for the same, and a program therefor, and particularly relates to a technology of determining a inter-pattern feature corresponding relationship.

BACKGROUND ART

A fingerprint verification device described in, for example, patent document 1 uses this kind of technology for determining an inter-pattern feature correspondence relationship. This fingerprint verification device is a device for verifying a match between fingerprint patterns.

The above-mentioned fingerprint verification device checks a match between a fingerprint to be searched for and a reference fingerprint by a brute force method with respect to all the feature points and determines a coordinate matching amount to a region in which the largest number of votes has been given by a vote for a coordinate matching parameter space from corresponding feature points that have been determined as a candidate.

Additionally, the fingerprint verification device performs a coordinate matching of the feature point based on this coordinate matching amount, performs a fine selection process in which a pair of candidates whose features are greatly different from each other are deleted and determines the corresponding feature points.

Additionally, as another technology for determining an inter-pattern feature correspondence relationship, a technology in which in order to determine the corresponding points, the point is used as a unit, a degree of similarity of the corresponding points is calculated based on a feature amount obtained from local pattern information that the each point has, an initialization of a degree of correspondence is performed, an update is performed, a convergence decision is made, and the corresponding points with a high degree of correspondence are extracted is shown as an example (refer to, for example, patent document 2).

Further, as another technology for determining an inter-pattern feature correspondence relationship, a technology in which a matching check is performed based on a connection state of the feature point on a ridge (refer to, for example, patent document 3).

[patent document 1] Japanese Patent Application Laid-Open No. 1984-778
[patent document 2] Japanese Patent Application Laid-Open No. 1999-110542
[patent document 3] Japanese Patent Application Laid-Open No. 1999-195119

DISCLOSURE OF THE INVENTION

Problems to be Solved by the Invention

However, in the fingerprint verification device mentioned above, in case of the technology described in the above-mentioned patent document 1, the fingerprint pattern changes every time when the fingerprint is taken. Therefore, when a pattern to be verified includes an elastic distortion variation component that can not be indicated by an assumed geometric transformation, the true corresponding feature points may be greatly different from each other when the overall variation between the patterns to be verified is indicated by using a coordinate matching parameter. Whereby, a problem in which verification of the match between the patterns becomes difficult occurs.

In the fingerprint verification device mentioned above, in a coordinate matching process of the feature point that is performed in order to finely select a pair of candidates, the overall variation between the patterns to be verified is dealt with as one rigid-body motion. Therefore, when the patterns to be verified include the elastic distortion variation component that can not be indicated by the assumed geometric transformation, a part of the true corresponding feature points is deleted by this process. Accordingly, a problem in which the corresponding feature points for authentication are not sufficiently extracted occurs.

Further, the degree of similarity between the points can not be calculated by using the technology described in the above-mentioned patent document 2 when identification information of the each point is not used. The technology described in patent document 3 can not be used for a pattern in which the ridge does not exist.

Accordingly, the object of the present invention is to provide an inter-pattern feature corresponding device which can solve the above-mentioned problems and can determine a feature correspondence relationship between the patterns with high accuracy even if the patterns to be verified has a distortion, an inter-pattern feature corresponding method used for the same, and a program therefor.

Means for Solving the Problems

An inter-pattern feature corresponding device according to the present invention includes
generation means for setting N (N is an integer of two or more) feature points that are closely located to each other in an inputted pattern signal as a proximity feature point group, setting the proximity feature point group and an arrangement relationship numerical value group representing an arrangement relationship between the feature points of the proximity feature point group as a feature point group arrangement, and generating at least one of these,
detection means for performing a comparison of the arrangement relationship numerical value of a first pattern with the arrangement relationship numerical value of a second pattern that are generated by the generation means to detect corresponding feature point group arrangement candidates that correspond to each other,
update means for performing a comparison of the arrangement relationship numerical values related to the feature point of each feature point group arrangement and the feature point that is closely located to the feature point group arrangement with respect to the corresponding feature point group arrangement candidates, adding the proximity feature points that correspond to each other to the corresponding feature point group arrangement candidates, respectively and updating the corresponding feature point group arrangement candidates,
means for checking an accompanying corresponding feature point candidate of the corresponding feature point group arrangement candidate updated by the update means to determine an accompanying corresponding feature point of the corresponding feature point group arrangement candidate, and means for checking the corresponding feature point group arrangement candidates to determine the corresponding feature points that correspond to each other between the patterns.

An inter-pattern feature corresponding method according to the present invention is characterized by including:

a first step in which N (N is an integer of two or more) feature points that are closely located to each other in an inputted pattern signal are set as a proximity feature point group, the proximity feature point group and an arrangement relationship numerical value group representing an arrangement relationship between the feature points of the proximity feature point group are set as a feature point group arrangement, and at least one of these is generated, a second step in which a comparison of the arrangement relationship numerical value of a first pattern with the arrangement relationship numerical value of a second pattern that are generated in the first step is performed to detect corresponding feature point group arrangement candidates that correspond to each other, a third step in which a comparison of the arrangement relationship numerical values related to the feature point of each feature point group arrangement and the feature point that is closely located to the feature point group arrangement is performed with respect to the corresponding feature point group arrangement candidates, the proximity feature points that correspond to each other are added to the corresponding feature point group arrangement candidates, respectively and the corresponding feature point group arrangement candidates are updated, a fourth step in which an accompanying corresponding feature point candidate of the corresponding feature point group arrangement candidate updated in the third step is checked to determine an accompanying corresponding feature point of the corresponding feature point group arrangement candidate, and a fifth step in which the corresponding feature point group arrangement candidates are checked to determine the corresponding feature points that correspond to each other between the patterns.

A program according to the present invention which allows a central processing unit in the inter-pattern feature corresponding device with which the inter-pattern features correspond to each other by using feature point information of the pattern to perform a process is characterized by including the processes of:

a first process in which N (N is an integer of two or more) feature points that are closely located to each other in an inputted pattern signal are set as a proximity feature point group, the proximity feature point group and an arrangement relationship numerical value group representing an arrangement relationship between the feature points of the proximity feature point group are set as a feature point group arrangement, and at least one of these is generated, a second process in which a comparison of the arrangement relationship numerical value of a first pattern with the arrangement relationship numerical value of a second pattern that are generated in the first process is performed to detect corresponding feature point group arrangement candidates that correspond to each other, a third process in which a comparison of the arrangement relationship numerical values related to the feature point of each feature point group arrangement and the feature point that is closely located to the feature point group arrangement is performed with respect to the corresponding feature point group arrangement candidates, the proximity feature points that correspond to each other are added to the corresponding feature point group arrangement candidates, respectively and the corresponding feature point group arrangement candidates are updated, a fourth process in which an accompanying corresponding feature point candidate of the corresponding feature point group arrangement candidate updated in the third process is checked to determine an accompanying corresponding feature point of the corresponding feature point group arrangement candidate, and a fifth process in which the corresponding feature point group arrangement candidates are checked to determine the corresponding feature points that correspond to each other between the patterns.

Effect of the Invention

The present invention has the configuration and operates as mentioned above. Therefore, the present invention has an effect in which feature correspondence relationship between the patterns can be determined with high accuracy even if the pattern to be verified has a distortion.

BEST MODE FOR CARRYING OUT THE INVENTION

Figure 1:
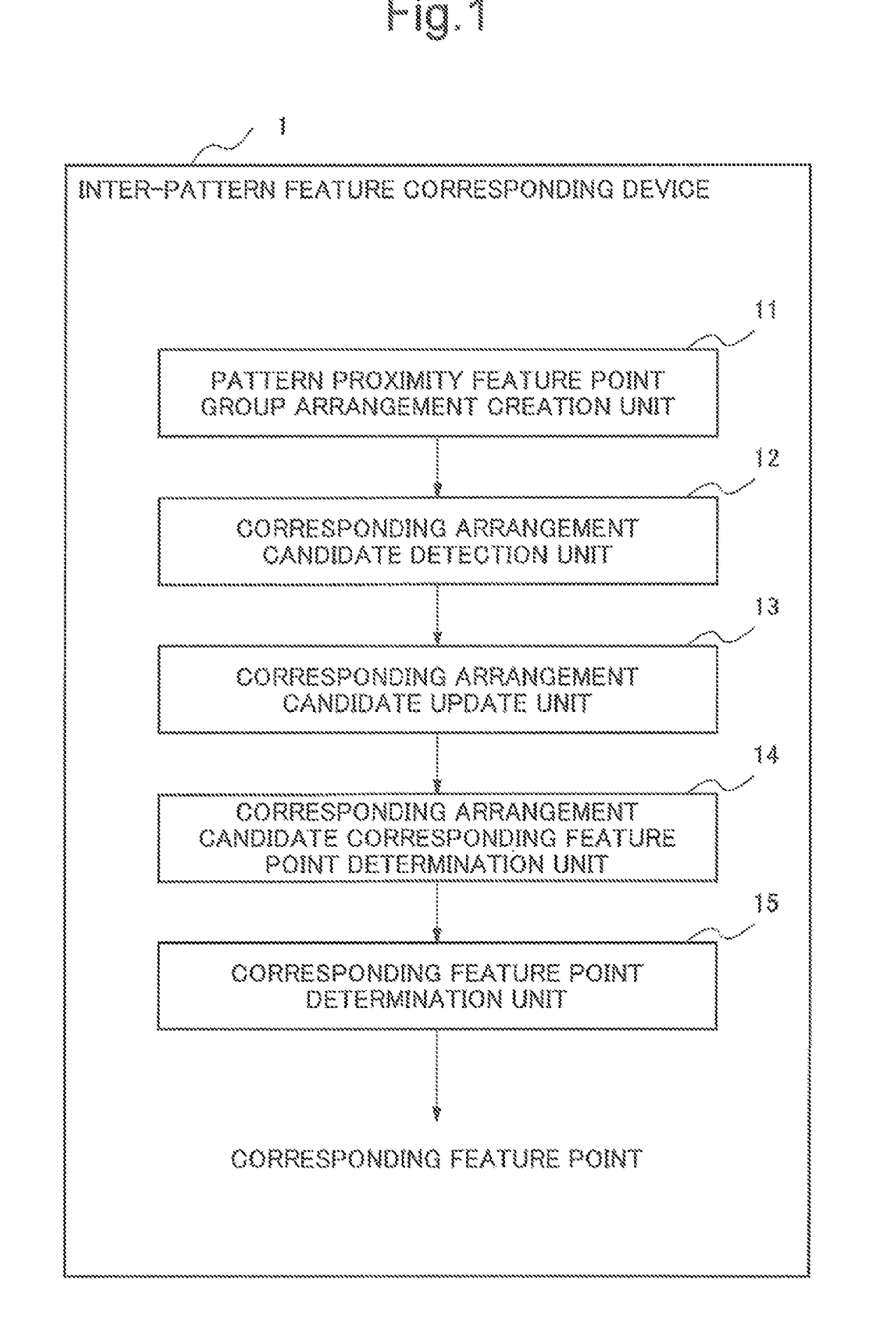
FIG. 1 is a block diagram showing an exemplary configuration of an inter-pattern feature corresponding device according to a first exemplary embodiment of the present invention.

Next, an exemplary embodiment of the present invention will be described with reference to drawings. FIG. 1 is a block diagram showing an exemplary configuration of an inter-pattern feature corresponding device according to a first exemplary embodiment of the present invention. In FIG. 1, an inter-pattern feature corresponding device 1 includes a pattern proximity feature point group arrangement creation unit 11, a corresponding arrangement candidate detection unit 12, a corresponding arrangement candidate update unit 13, a corresponding arrangement candidate corresponding feature point determination unit 14 and a corresponding feature point determination unit 15.

Figure 2:
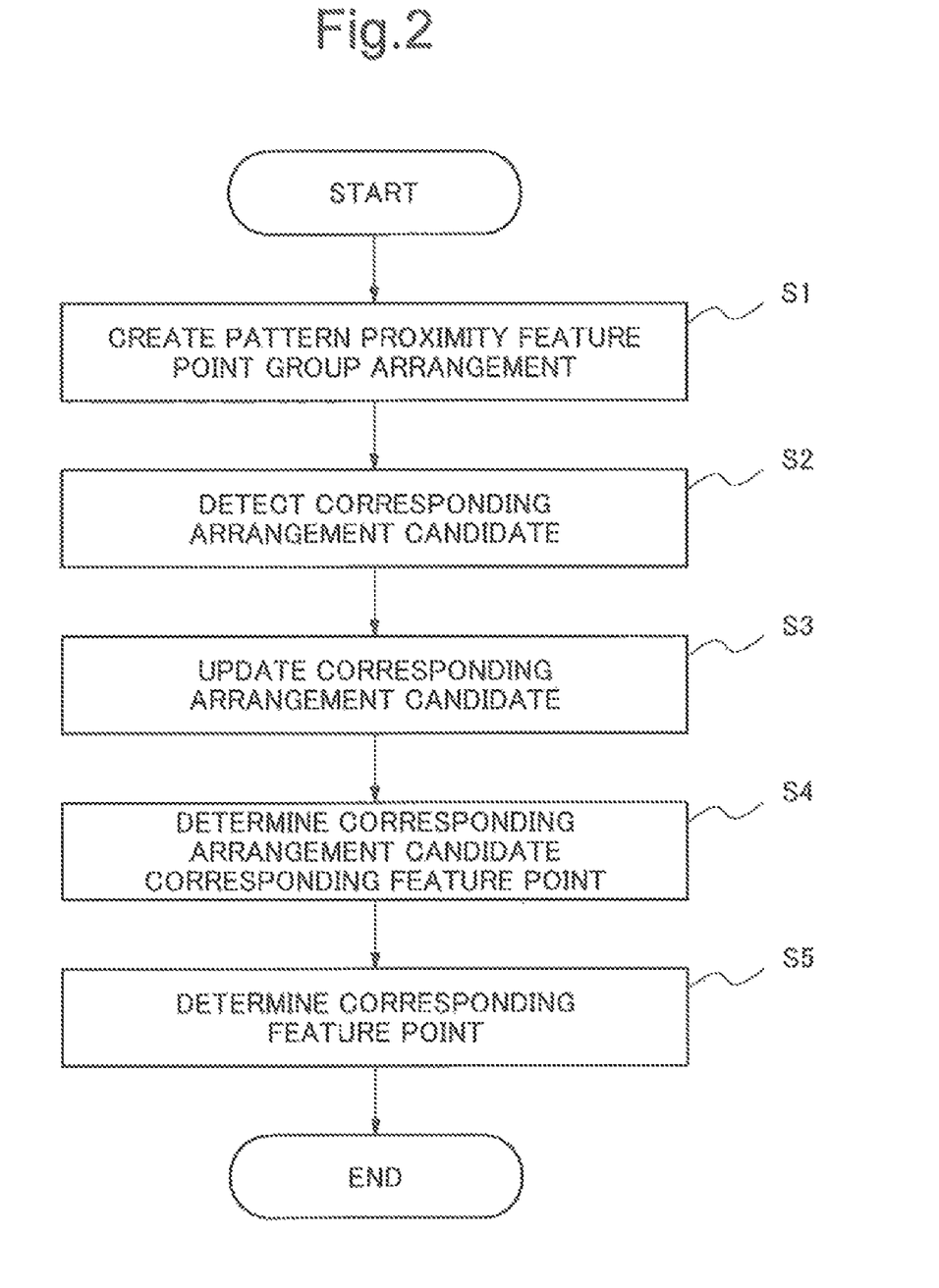
FIG. 2 is a flowchart showing an operation of a method of inter-pattern feature corresponding according to a first exemplary embodiment of the present invention.

FIG. 2 is a flowchart showing an operation of an inter-pattern feature corresponding method according to the first exemplary embodiment of the present invention. The operation of the inter-pattern feature corresponding method according to the first exemplary embodiment of the present invention will be described with reference to FIG. 1 and FIG. 2.

The pattern proximity feature point group arrangement creation unit 11 of the inter-pattern feature corresponding device 1 inputs the pattern signal and creates the arrangement of the proximity feature point group in the pattern signal (step S1 in FIG. 2). The corresponding arrangement candidate detection unit 12 checks a match between the proximity feature point group arrangements that are created in the pattern signal by the pattern proximity feature point group arrangement creation unit 11 with respect to the input patterns and detects the feature point group arrangement candidates that correspond to each other (step S2 in FIG. 2).

The corresponding arrangement candidate update unit 13 checks the match of the arrangement relationships for each feature point group arrangement and the proximity feature point of it with respect to the corresponding (feature point group) arrangement candidates detected by the corresponding arrangement candidate detection unit 12, adds the proximity feature points that correspond to each other and updates the corresponding arrangement candidates (FIG. 2 in step S3).

The corresponding arrangement candidate corresponding feature point determination unit 14 checks each corresponding feature point candidate that accompanies the corresponding arrangement candidate with respect to each corresponding arrangement candidate whose update has been completed by the corresponding arrangement candidate update unit 13 and determines the corresponding feature point that accompanies the corresponding arrangement candidate (step S4 in FIG. 2).

The corresponding feature point determination unit 15 checks the each corresponding arrangement candidate whose accompanying corresponding feature point has been determined by the corresponding arrangement candidate corresponding feature point determination unit 14 and derives corresponding arrangements that correspond to each other between the patterns and the corresponding feature point that accompanies it (step S5 in FIG. 2).

Figure 3A:
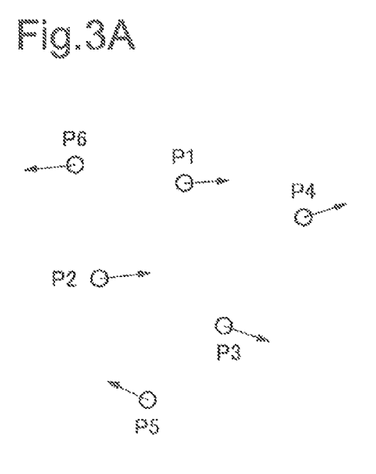
FIG. 3A and FIG. 3B are figures for illustrating a method for generating a proximity feature point group arrangement in a first exemplary embodiment of the present invention.
Figure 3B:
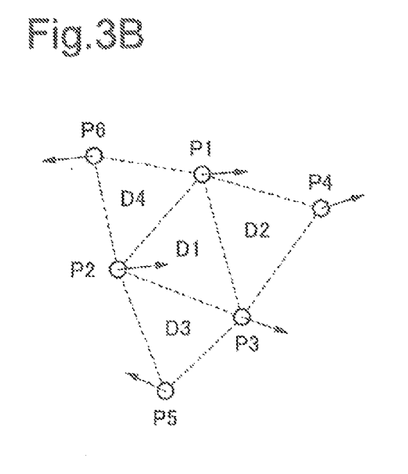
Figure 4A:
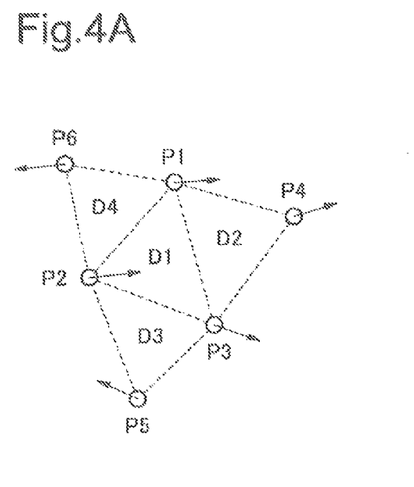
FIG. 4A and FIG. 4B are figures for illustrating a method for detecting a corresponding feature point group arrangement candidate in a first exemplary embodiment of the present invention.
Figure 4B:
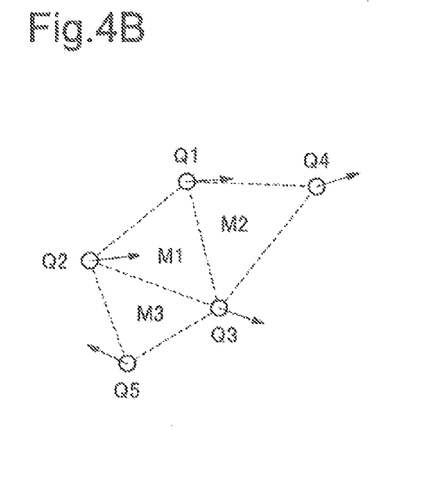
Figure 5A:
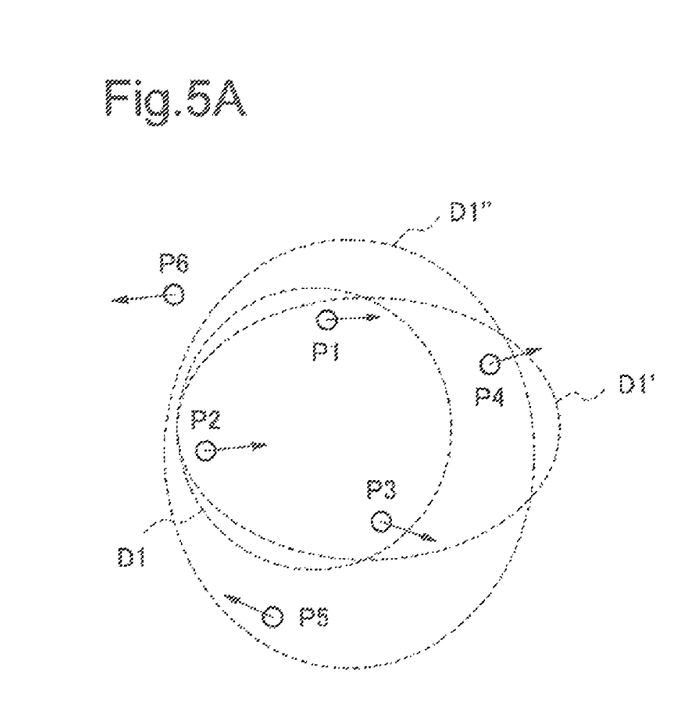
FIG. 5A and FIG. 5B are figures for illustrating a method for updating a corresponding feature point group arrangement candidate in a first exemplary embodiment of the present invention.
Figure 5B:
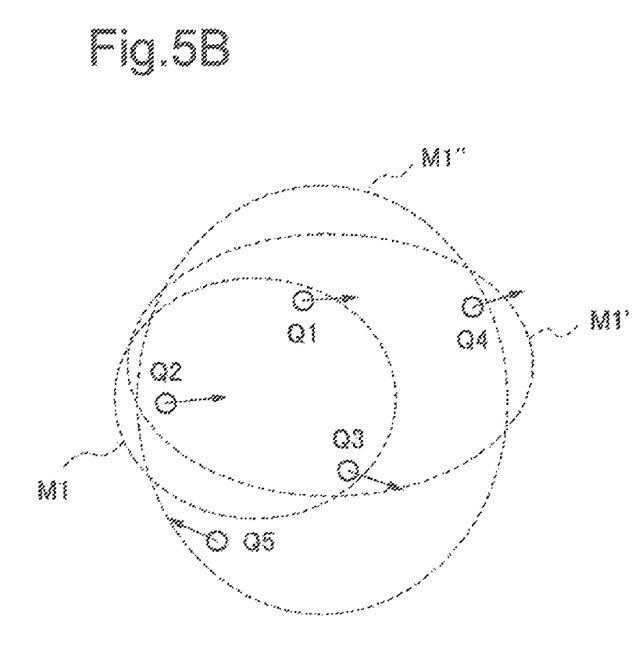

FIG. 3A and FIG. 3B are figures for illustrating a method for generating the proximity feature point group arrangement in the first exemplary embodiment of the present invention. FIG. 4A and FIG. 4B are figures for illustrating a method for detecting the corresponding feature point group arrangement candidate in the first exemplary embodiment of the present invention. FIG. 5A and FIG. 5B are figures for illustrating a method for updating the corresponding feature point group arrangement candidate in the first exemplary embodiment of the present invention.

Figure 6A:
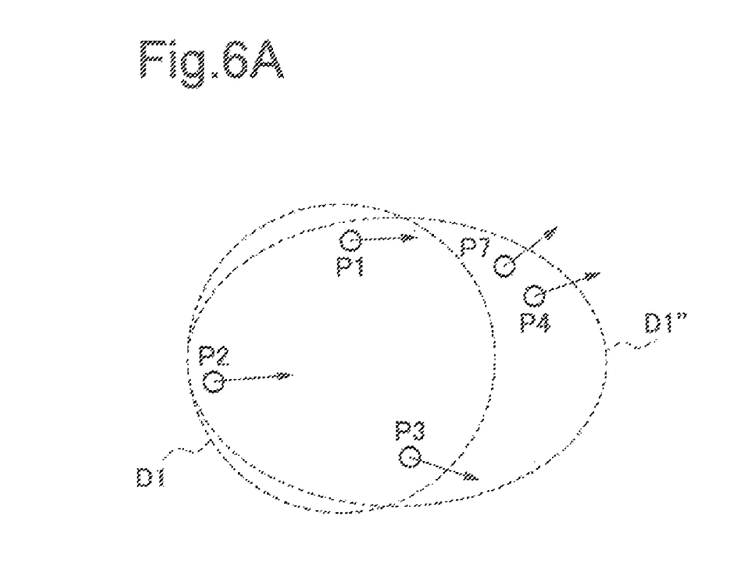
FIG. 6A and FIG. 6B are figures for illustrating a selection of an accompanying corresponding feature point candidate in a first exemplary embodiment of the present invention.
Figure 6B:
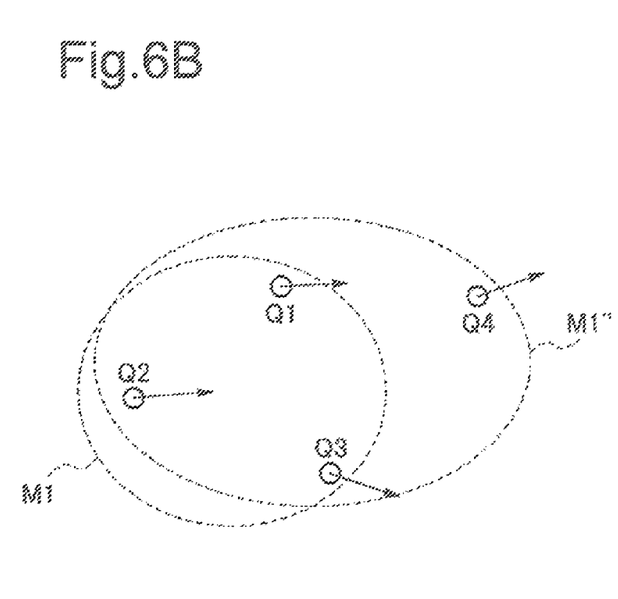
Figure 7:
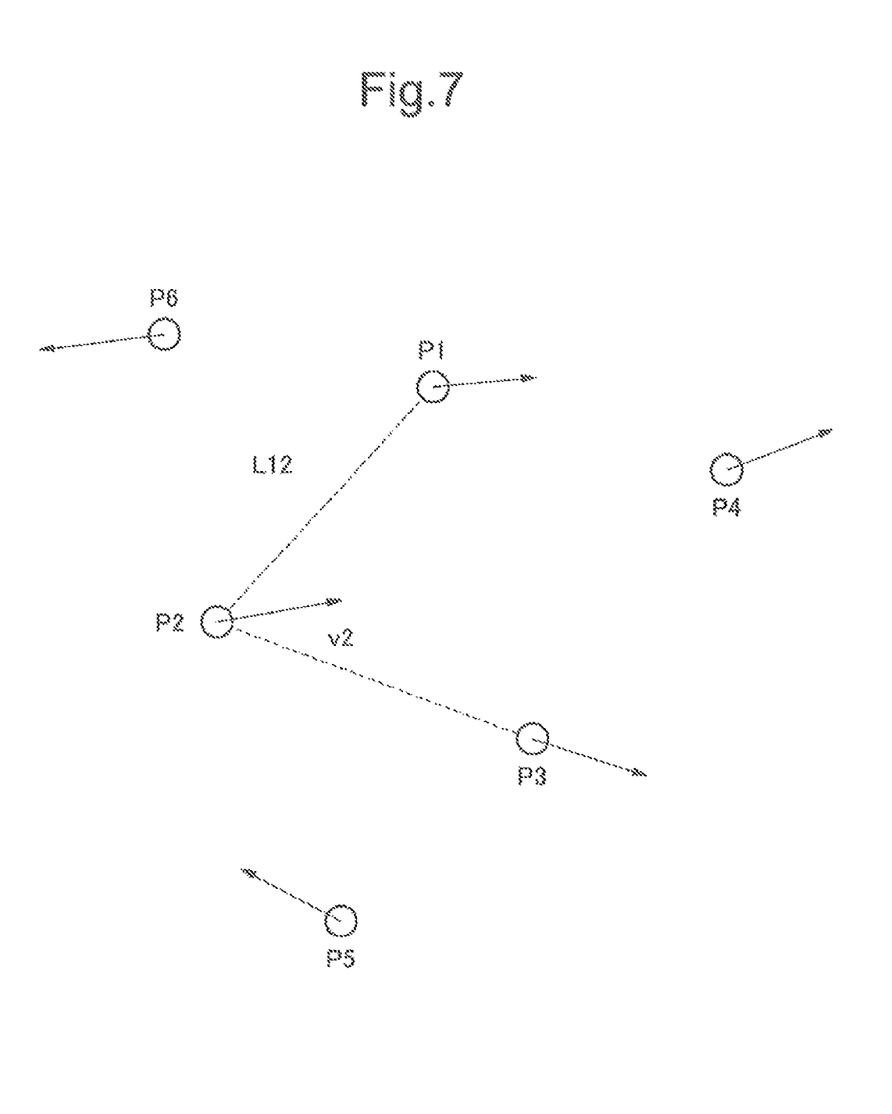
FIG. 7 is a figure for illustrating a feature point related arrangement relationship numerical value in a first exemplary embodiment of the present invention.
Figure 8A:
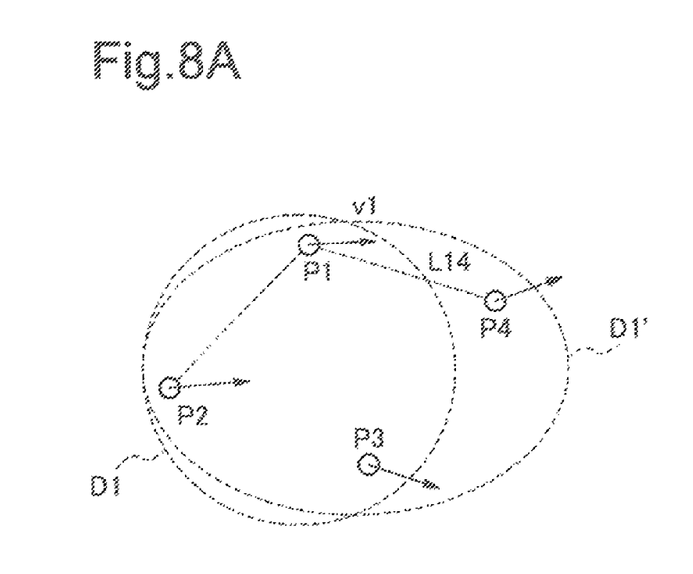
FIG. 8A and FIG. 8B are figures for illustrating a comparison of the arrangement relationships, each of which showing an arrangement of the feature point of the feature point group arrangement and the feature point that is closely located to the feature point group arrangement in the first exemplary embodiment of the present invention.
Figure 8B:
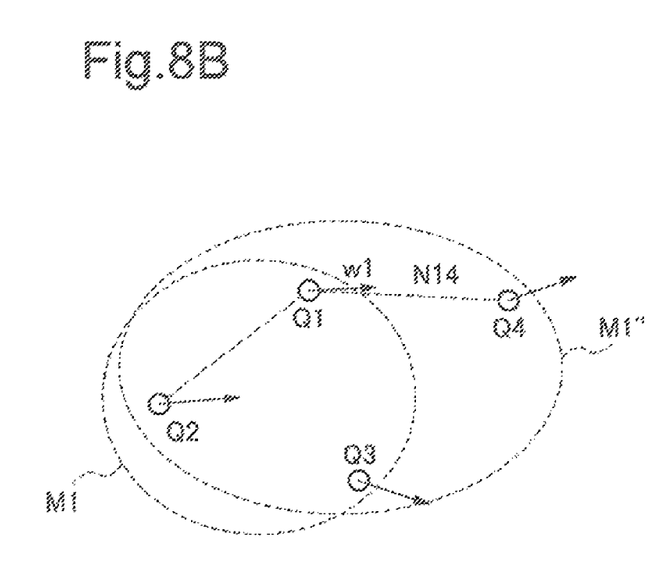

FIG. 6A and FIG. 6B are figures for illustrating a selection of the accompanying corresponding feature point candidate in the first exemplary embodiment of the present invention. FIG. 7 is a figure for illustrating a feature point related arrangement relationship numerical value in the first exemplary embodiment of the present invention. FIG. 8A and FIG. 8B are figures for illustrating a comparison of the arrangement relationships, each of which showing an arrangement of the feature point of the feature point group arrangement and the feature point that is closely located to the feature point group arrangement in the first exemplary embodiment of the present invention.

An operation of the inter-pattern feature corresponding method according to the first exemplary embodiment of the present invention will be described in detail with reference to FIG. 1 to FIG. 8. All units of the above-mentioned inter-pattern feature corresponding device 1 operate as follows.

The pattern proximity feature point group arrangement creation unit 11 inputs the pattern signal and creates an arrangement of the proximity feature point group in the pattern signal. The arrangement of the proximity feature point group includes a set of the feature points detected in the pattern signal and the arrangement relationship numerical value group representing the arrangement relationship between the feature points of the set of the feature points. The feature point related arrangement relationship numerical value includes numerical data with which the arrangement between the feature points can be determined, such as a distance between the feature points, an intersection angle between the vectors connecting the feature points, a difference in a feature point direction between the feature points, or the like.

In this exemplary embodiment, the proximity feature point group is a set of the feature points that are closely located to each other in the pattern signal. All arrangements of the proximity feature point group are identified by an identifier (ID) and managed. Further, it is desirable that the number of feature points of the created proximity feature point group arrangement is two or more and a fixed integer N.

FIG. 3A and FIG. 3B are fragmentary enlarged views schematically showing a feature point of a fingerprint pattern and a proximity feature point group arrangement thereof as an example of the pattern. FIG. 3A shows a spatial distribution of feature points (P1 to P6) of the fingerprint. FIG. 3B shows arrangements (D1 to D4) of the proximity feature point groups, each of which including three feature points.

FIG. 7 schematically shows an example of the feature point related arrangement relationship numerical value. For example, a distance L12 between the feature point P1 and the feature point P2, the intersection angle between an inter-feature point vector P2P1 and an inter-feature point vector P2P3, or a feature point direction v1 to the arbitrary inter-feature point vector or the like of an arrangement P1P2P3 of the feature point P1 when the feature point direction can be detected for each feature point like the fingerprint pattern can be used as the feature point related arrangement relationship numerical value.

The corresponding arrangement candidate detection unit 12 checks a match between all the feature point group arrangements that are created in the pattern signal with respect to the input patterns to detect the feature point group arrangement candidates that correspond to each other. The matching check of the feature point group arrangements is performed by checking whether or not a difference between the feature point related arrangement relationship numerical values or the like is within a predetermined allowable range. The corresponding arrangement candidate detection unit 12 registers the feature point group arrangements that correspond to each other between the patterns and pass the matching check as the corresponding arrangement candidate.

The feature point related arrangement relationship numerical value used for the matching check of the feature point group arrangements may be measured by using a general image coordinate system for a reference coordinate system. However, it is desirable to use a streamline coordinate system in the pattern that is proposed by the applicant of this patent application as the reference coordinate system when the elastic distortion component is included between the patterns like the fingerprint verification. By using this, the variation of the feature point related arrangement relationship numerical value becomes small.

As a result, an effect in which "noise" such as erroneous correspondence due to an erroneous detection of the feature point group arrangement or the like can be reduced by reducing the allowable range and whereby a detection accuracy can be improved, for example, the true corresponding feature point group arrangement can be easily detected or the like, is obtained. When the streamline coordinate system is used as the reference coordinate system, the feature points that are located apart from each other can be dealt with as the proximity feature point. Therefore, an effect in which the number of the patterns that can be verified increases is obtained.

The streamline coordinate system is obtained by detecting the streamline in the pattern signal and setting a coordinate system corresponding to the direction of the detected streamline (referred to as "streamline coordinate system"). For example, a coordinate system which is peculiarly determined by a distribution of a flow direction of the pattern on a strip pattern that is deformed and specified by a curve group composed of a streamline curve and a normal line curve that are orthogonal to each other is defined as the streamline coordinate system (referred to as "natural coordinate system") of the pattern. The curve group is called "coordinate curve group" and an attribute such as a position of each point in the pattern in the streamline coordinate system, a posture, or the like is determined by the relation between the point and each coordinate curve.

FIG. 4A and FIG. 4B are fragmentary enlarged views schematically showing the feature point and the proximity feature point group arrangement of a pattern to be searched for and a reference pattern that are compared with each other for the explanation of the detection of the corresponding arrangement candidates that correspond to each other between the patterns. FIG. 4A shows the proximity feature point group arrangements D1 to D4 of the pattern to be searched for. FIG. 4B shows the proximity feature point group arrangements M1 to M3 of the reference pattern. In this example, a plurality of pairs of the proximity feature point group arrangements (D1, M1), (D2, M2), and (D3, M3) pass the matching check and these are detected as the corresponding arrangement candidate.

The corresponding arrangement candidate update unit 13 checks a match between the arrangement relationship numerical values of the feature point of each feature point group arrangement of the corresponding arrangement candidate and the feature point that is closely located to the feature point group arrangement with respect to the corresponding arrangement candidates and adds the proximity feature points to which it is determined that the arrangement relationship numerical values match with each other based on the check result to the corresponding feature point group arrangement as a new corresponding feature point candidate. Such check and addition process is performed to all the proximity feature points sequentially and the update of the corresponding arrangement candidate is continuously performed as much as possible.

FIG. 5A and FIG. 5B schematically show the arrangement candidate to which it is determined that the arrangement relationship numerical values match with each other and the proximity feature point of these arrangements with respect to the pattern to be searched for and the reference pattern. FIG. 5A shows the feature point group arrangement D1 and the proximity feature points P4 to P6 thereof of the pattern to be searched for. FIG. 5B shows the feature point group arrangement M1 and the proximity feature points Q4 to Q5 thereof of the reference pattern.

In this example, the feature point group arrangements D1 and M1 are the corresponding arrangement candidates that pass the arrangement matching check. In order to update the corresponding arrangement candidate, for example, a positional relationship numerical value of the arrangement D1 and the feature point P4 is compared with the positional relationship numerical value of the arrangement M1 and the feature point Q4. If the difference between the positional relationship numerical values is within a predetermined allowable range, the feature points P4 and Q4 are added to the feature point group arrangements D1 and M1, respectively and the corresponding arrangements (D1, M1) is replaced with the new corresponding arrangements (D1', M1').

When the positional relationship numerical value of the arrangement D1 and the feature point P4 is compared with the positional relationship numerical value of the arrangement M1 and the feature point Q4, as shown in FIG. 8A and FIG. 8B, for example, a distance L14 between the feature points P1 and P4 is compared with a distance N14 between the feature points Q1 and Q4 and additionally, a comparison of the intersection angle between the inter-feature point vector P1P2 and the inter-feature point vector P1P4 with the intersection angle between the inter-feature point vector Q1Q2 and the inter-feature point vector Q1Q4 or the like has to be performed. That is because the positional relationship between the feature point P4 and the arrangement P1P2P3 can not be determined by using only the distance L14.

In a case in which the feature point direction of the feature point can be detected like a fingerprint pattern, the comparison of the intersection angle between the feature point direction v1 and the feature point vector with the intersection angle between the feature point direction w1 and the corresponding feature point vector may be performed instead of the above-mentioned comparison in which a comparison is made of the intersection angle between the feature point vectors.

In the same manner, with respect to the newly created corresponding arrangements (D1', M1'), the positional relationship numerical value between the arrangement D1' and the proximity feature point P5 is compared with the positional relationship numerical value between the arrangement M1' and the proximity feature point Q5 and if the difference between the arrangement relationship numerical values is within a predetermined allowable range, the feature points P5 and Q5 are added to the arrangements D1' and M', respectively. The corresponding arrangements (D1', M1') are replaced with corresponding arrangements (D1", M1").

Thus, the corresponding arrangement candidate update unit 13 continues to sequentially perform the check and update of the corresponding arrangement candidate. When the check has been completed for all the corresponding arrangement candidates, the corresponding arrangement candidate update unit 13 records the corresponding arrangement that is not updated any more. The pairs of the feature points P1-Q1, P2-Q2, P3-Q3, P4-Q4, and P5-Q5, each of which corresponds to each other, of the corresponding arrangement candidates (D1", M1") whose update has been completed are set as the accompanying corresponding feature point candidate of the corresponding arrangement candidate.

The corresponding arrangement candidate corresponding feature point determination unit 14 checks each corresponding feature point candidate that accompanies the corresponding arrangement candidate with respect to the corresponding arrangement candidate whose update has been completed and determines the corresponding feature point of the corresponding arrangement candidate. The check of each corresponding feature point candidate is performed based on the correspondence relationship of the proximity feature point of the corresponding feature point candidate.

This process is needed because when the corresponding proximity feature point is added in the corresponding arrangement candidate update unit 13, there is a possibility in which one to one characteristic of the feature point correspondence is not met between the corresponding feature point that is newly added and the accompanying corresponding feature point candidate that is existing.

FIG. 6A and FIG. 6B show a corresponding arrangement in which the one to one characteristic of the feature point correspondence is not met as shown above. The arrangement D1 in FIG. 6A and the arrangement M1 in FIG. 6B are the corresponding arrangement candidates. It is necessary to determine the correspondence relationship between the proximity feature points (P4 and P7) of the arrangement D1 and the proximity feature point (Q4) of the arrangement M1. However, if it is selected based on information on the corresponding arrangement (D1, M1), a possibility of erroneous selection is large.

For this reason, in order to keep the true corresponding feature point as much as possible, even when the one to one characteristic of the feature point correspondence is not met in the corresponding arrangement candidate update unit 13, the proximity feature points P4-Q4 and P7-Q4 are added to the corresponding arrangement as the correspondence proximity feature point. At the time when the update of the corresponding arrangement has been completed, a process may be performed in which the candidate with a high degree of correspondence is kept with respect to the corresponding feature point candidate that does not meet the one to one characteristic. The degree of correspondence is determined based on the degree of correspondence of the feature point in a proximity area whose center is the feature point candidate, for example, the number of the corresponding feature points or the like.

The corresponding feature point determination unit 15 evaluates each corresponding arrangement candidate to which the determination of the accompanying corresponding feature point has been completed and derives a final corresponding arrangement and the accompanying corresponding feature point. The evaluation of the corresponding arrangement candidate can be effectively performed by using, for example, a method in which the evaluation is performed based on the number of the accompanying corresponding feature points of the corresponding arrangement candidate. When the corresponding arrangement is determined once, it is desirable that the corresponding feature point determination unit 15 outputs the corresponding feature point that accompanies it as the final corresponding feature point.

Thus, in this exemplary embodiment, even if the distortion is generated between the patterns to be verified, the effect of the distortion can be suppressed and the verification of a match between the patterns can be performed. Additionally, in this exemplary embodiment, even if the distortion is generated between the patterns to be verified, the effect of the distortion can be suppressed and the extraction of the corresponding feature points that correspond to each other between the patterns can be performed.

Figure 9:
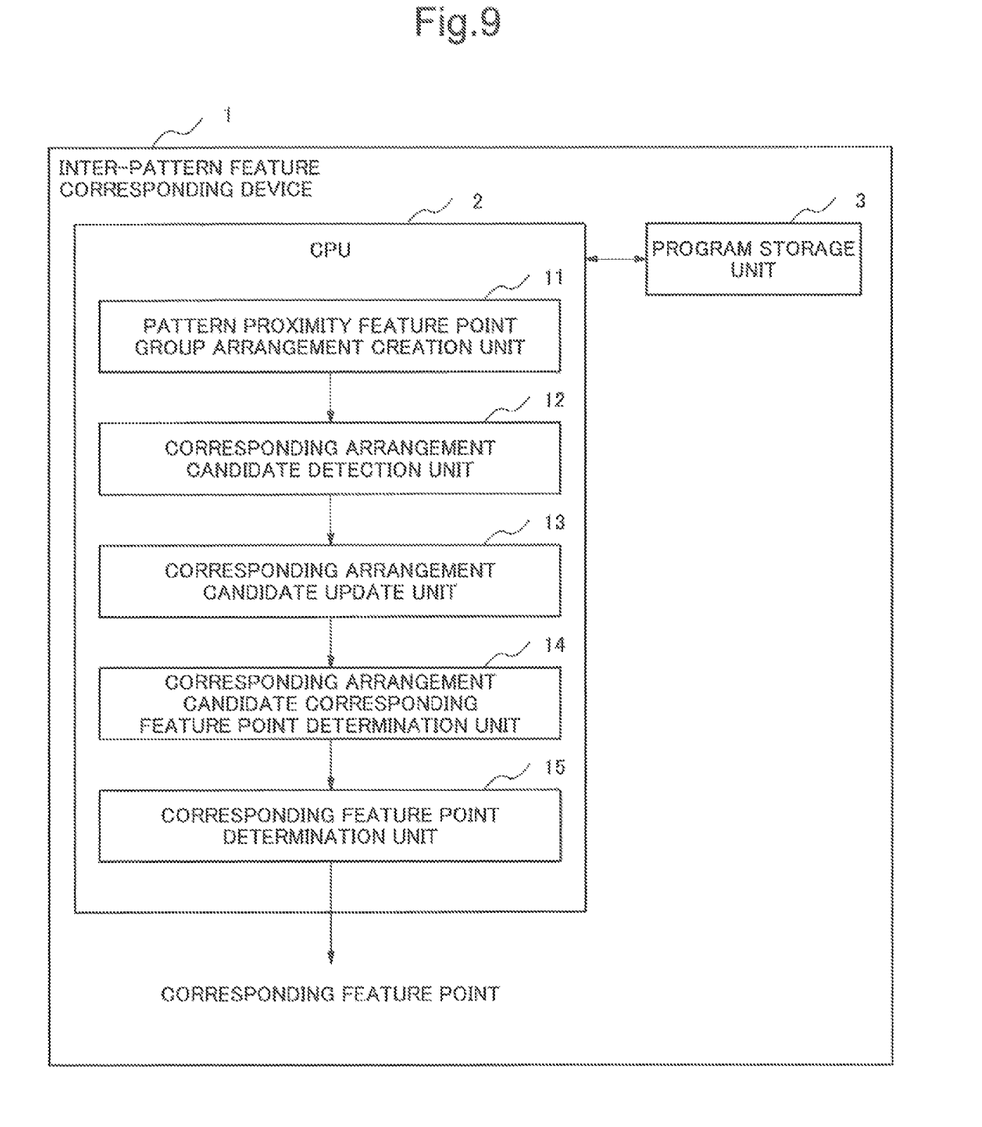
FIG. 9 is a block diagram showing an exemplary configuration of an inter-pattern feature corresponding device according to a second exemplary embodiment of the present invention.

FIG. 9 is a block diagram showing an exemplary configuration of an inter-pattern feature corresponding device according to a second exemplary embodiment of the present invention. In FIG. 9, the inter-pattern feature corresponding device 1 includes a CPU (central processing unit) 2 and a program storage unit 3 for storing a program executed by the CPU 2.

In the inter-pattern feature corresponding device 1, the CPU 2 executes the program stored in the program storage unit 3 and whereby a process performed by the pattern proximity feature point group arrangement creation unit 11, the corresponding arrangement candidate detection unit 12, the corresponding arrangement candidate update unit 13, the corresponding arrangement candidate corresponding feature point determination unit 14 and the corresponding feature point determination unit 15 mentioned above is realized.

Accordingly, in the inter-pattern feature corresponding device of the second exemplary embodiment of the present invention, the CPU 2 executes the program stored in the program storage unit 3 and whereby the inter-pattern feature corresponding device of the second exemplary embodiment has the same effect as that of the first exemplary embodiment.

Figure 10:
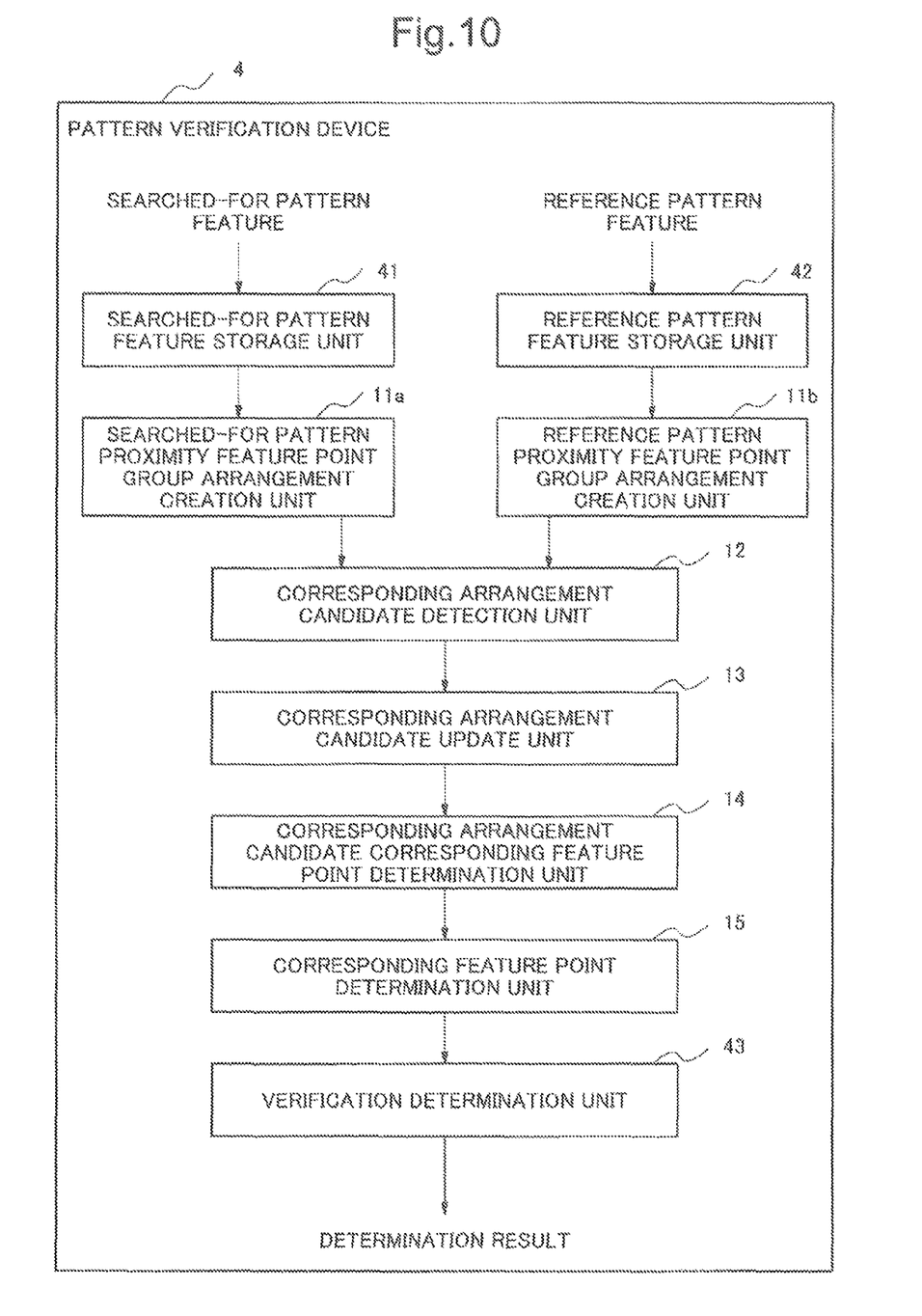
FIG. 10 is a block diagram showing an exemplary configuration of a pattern verification device according to a third exemplary embodiment of the present invention.

FIG. 10 is a block diagram showing an exemplary configuration of a pattern verification device according to a third exemplary embodiment of the present invention. In FIG. 10, a pattern verification device 4 includes a searched-for pattern feature storage unit 41, a reference pattern feature storage unit 42, a searched-for pattern proximity feature point group arrangement creation unit 11*a*, a reference pattern proximity feature point group arrangement creation unit 11*b*, the corresponding arrangement candidate detection unit 12, the corresponding arrangement candidate update unit 13, the corresponding arrangement candidate corresponding feature point determination unit 14, the corresponding feature point determination unit 15 and a verification determination unit 43.

The searched-for pattern feature storage unit 41 holds a pattern feature detected from the pattern to be searched for and attribute data including position data of its pattern feature together. The reference pattern feature storage unit 42 holds the pattern feature detected from the reference pattern and the attribute data including the position data of the pattern feature together.

The searched-for pattern proximity feature point group arrangement creation unit 11*a* detects a combination of the feature points that are closely located to the combinations of the pattern feature data held in the searched-for pattern feature storage unit 41 as a searched-for pattern side proximity feature point group arrangement. The reference pattern proximity feature point group arrangement creation unit 11*b* detects a combination of the feature points that are closely located to the combinations of the pattern feature data held in the reference pattern feature storage unit 42 as a reference pattern side proximity feature point group arrangement.

The corresponding arrangement candidate detection unit 12 reads out each of the proximity feature point arrangement data detected by the searched-for pattern proximity feature point group arrangement creation unit 11*a* and the reference pattern proximity feature point group arrangement creation unit 11*b* in order, makes a comparison of inter-feature point relative distances, the intersection angles, the feature point directions and the like with respect to the proximity feature point group arrangements, and detects the corresponding feature point group arrangements that correspond to each other by a brute force method.

The corresponding arrangement candidate update unit 13 checks the match of relationship between the feature point group arrangements that correspond to each other and the proximity feature point of this feature point group arrangements, adds the proximity feature point to the corresponding feature point group arrangements as the corresponding proximity feature point based on the check result, and updates the corresponding feature point group arrangement.

The corresponding arrangement candidate corresponding feature point determination unit 14 finely selects each corresponding feature point candidate that accompanies the corresponding arrangement candidate based on the degree of correspondence of the proximity feature point of the corresponding feature point candidate with respect to each corresponding arrangement candidate whose update has been completed and determines the corresponding feature point. The corresponding feature point determination unit 15 evaluates each corresponding arrangement candidate to which the determination of the accompanying corresponding feature point has been completed, determines a proper corresponding arrangement and outputs the corresponding feature point that accompanies it.

The verification determination unit 43 determines the match of the patterns according to the data of the corresponding feature point outputted to the corresponding feature point determination unit 15. For example, a score is derived from the number of the corresponding feature points and when the score exceeds a predetermined threshold value, it may be determined by the result of the verification that the patterns matches with each other.

When the pattern verification device 4 according to this exemplary embodiment is used for a fingerprint verification system (security management system), the determination result of the verification determination unit 43 is used for, for example, a permission for entering a building, a permission for entering an area in the building, or the like.

In this exemplary embodiment, because all processes from an input process of the pattern feature point to a determination process of the corresponding feature point are performed based on a local positional relationship of the feature point, even when the pattern has a distortion, the corresponding feature point can be extracted with high accuracy as compared to a corresponding feature point determination device based on coordinate matching. As a result, high accurate pattern verification can be realized by using this exemplary embodiment.

Further, all or a part of processes/functions performed by the searched-for pattern proximity feature point group arrangement creation unit 11a, the reference pattern proximity feature point group arrangement creation unit 11b, the corresponding arrangement candidate detection unit 12, the corresponding arrangement candidate update unit 13, the corresponding arrangement candidate corresponding feature point determination unit 14, the corresponding feature point determination unit 15 and the verification determination unit 43 may be realized by the program executed on the computer.

This application is the National Phase of PCT/JP2008/073204, filed Dec. 19, 2008, which claims priority based on the Japanese Patent Application No. 2007-333390 filed on Dec. 26, 2007 and the disclosure of which is hereby incorporated by reference in its entirety.

INDUSTRIAL APPLICABILITY

The present invention can be applied to the applications such as personal identification, personal identity confirmation or suspect candidate search in which a match of fingerprint patterns or palm print patterns is checked.

DESCRIPTION OF SYMBOL

1 inter-pattern feature corresponding device
2 CPU
3 program storage unit
4 pattern verification device
11 pattern proximity feature point group arrangement creation unit
11a searched-for pattern proximity feature point group arrangement creation unit
11b reference pattern proximity feature point group arrangement creation unit
12 corresponding arrangement candidate detection unit
13 corresponding arrangement candidate update unit
14 corresponding arrangement candidate corresponding feature point determination unit
15 corresponding feature point determination unit
41 searched-for pattern feature storage unit
42 reference pattern feature storage unit
43 verification determination unit

The invention claimed is:

1. An inter-pattern feature corresponding device characterized by including:
a generation unit that sets N (N is an integer of two or more) feature points that are closely located to each other in an inputted pattern signal as a proximity feature point group, setting the proximity feature point group and an arrangement relationship numerical value group representing an arrangement relationship between the feature points of the proximity feature point group as a feature point group arrangement, and generating at least one of these,
a detection unit that performs a comparison of the arrangement relationship numerical value of a first pattern with the arrangement relationship numerical value of a second pattern that are generated by the generation unit to detect corresponding feature point group arrangement candidates that correspond to each other,
an update unit that performs a comparison of the arrangement relationship numerical values related to the feature point of each feature point group arrangement and the feature point that is closely located to the feature point group arrangement with respect to the corresponding feature point group arrangement candidates, adding the proximity feature points that correspond to each other to the corresponding feature point group arrangement candidates, respectively and updating the corresponding feature point group arrangement candidates,
a unit that checks an accompanying corresponding feature point candidate of the corresponding feature point group arrangement candidate updated by the update unit to determine an accompanying corresponding feature point of the corresponding feature point group arrangement candidate, and
a unit that checks the corresponding feature point group arrangement candidates to determine the corresponding feature points that correspond to each other between the patterns.

2. The inter-pattern feature corresponding device according to claim 1 including a unit that detects a streamline in the pattern signal and setting a streamline coordinate system corresponding to the direction of the detected streamline and the feature point related arrangement relationship numerical value is obtained by using the streamline coordinate system as the reference coordinate system.

3. The inter-pattern feature corresponding device according to claim 1 characterized in that the feature point related arrangement relationship numerical value includes at least one of:
- a distance of the other feature point in the reference coordinate system when viewed from the one feature point;
- a shift of an azimuth angle of the other two feature points in the reference coordinate system when viewed from the one feature point; and
- a shift of a feature point direction of the other feature point in the reference coordinate system when viewed from the one feature point.

4. The inter-pattern feature corresponding device according to claim 1 characterized in that a comparison is performed for the distance between the first feature point of each feature point group arrangement and a second proximity feature point that is closely located to the corresponding feature point group arrangement and an azimuth angle shift between the second proximity feature point and a third feature point of the other corresponding feature point group arrangement when viewed from the first feature point with respect to the corresponding feature point group arrangement candidates, the proximity feature points that correspond to each other are added to the corresponding feature point group arrangement candidates, and the corresponding feature point group arrangement candidates are updated.

5. The inter-pattern feature corresponding device according to claim 1 characterized in that a comparison is performed for the distance between the first feature point of each feature point group arrangement and a second proximity feature point that is closely located to the feature point group arrangement and the shift in the feature point direction of the second proximity feature point to the first feature point with respect to the corresponding feature point group arrangement candidates, the proximity feature points that correspond to each other are added to the corresponding feature point group arrangement candidates, and the corresponding feature point group arrangement candidates are updated.

6. The inter-pattern feature corresponding device according to claim 1 characterized in that a check to the accompanying corresponding feature point candidate of the corresponding feature point group arrangement candidate updated by the update unit is performed to the corresponding feature point candidates in which one to one characteristic is not met.

7. The inter-pattern feature corresponding device according to claim 1 characterized in that a check to the accompanying corresponding feature point candidate of the corresponding feature point group arrangement candidate updated by the update unit is based on a correspondence relationship of the proximity feature point of the corresponding feature point candidate.

8. The inter-pattern feature corresponding device according to claim 1 characterized in that the check to the corresponding feature point group arrangement candidate is based on the number of the accompanying corresponding feature points of the corresponding feature point group arrangement candidate.

9. An inter-pattern feature corresponding method characterized by including:
- setting N (N is an integer of two or more) feature points that are closely located to each other in an inputted pattern signal as a proximity feature point group, setting the proximity feature point group and an arrangement relationship numerical value group representing an arrangement relationship between the feature points of the proximity feature point group as a feature point group arrangement, and generating at least one of these,
- performing a comparison of the arrangement relationship numerical value of a first pattern with the generated arrangement relationship numerical value of a second pattern to detect corresponding feature point group arrangement candidates that correspond to each other,
- performing a comparison of the arrangement relationship numerical values related to the feature point of each feature point group arrangement and the feature point that is closely located to the feature point group arrangement with respect to the corresponding feature point group arrangement candidates, adding the proximity feature points that correspond to each other to the corresponding feature point group arrangement candidates, updating respectively and the corresponding feature point group arrangement candidates,
- checking an accompanying corresponding feature point candidate of the updated corresponding feature point group arrangement candidate to determine an accompanying corresponding feature point of the corresponding feature point group arrangement candidate, and
- checking the corresponding feature point group arrangement candidates to determine the corresponding feature points that correspond to each other between the patterns.

10. The inter-pattern feature corresponding method according to claim 9 characterized by including:
- detecting a streamline in the pattern signal and setting a streamline coordinate system corresponding to a direction of the detected streamline,
- obtaining the feature point related arrangement relationship numerical value by using the streamline coordinate system as a reference coordinate system.

11. The inter-pattern feature corresponding method according to claim 9 characterized in that the feature point related arrangement relationship numerical value includes at least one of:
- a distance of the other feature point in the reference coordinate system when viewed from the one feature point;
- a shift of an azimuth angle of the other two feature points in the reference coordinate system when viewed from the one feature point; and
- a shift of a feature point direction of the other feature point in the reference coordinate system when viewed from the one feature point.

12. The inter-pattern feature corresponding method according to claim 9 characterized in that a comparison is performed for the distance between the first feature point of each feature point group arrangement and a second proximity feature point that is closely located to the corresponding feature point group arrangement and an azimuth angle shift between the second proximity feature point and a third feature point of the other corresponding feature point group arrangement when viewed from the first feature point with respect to the corresponding feature point group arrangement candidates, the proximity feature points that correspond to each other are added to the corresponding feature point group arrangement candidates, and the corresponding feature point group arrangement candidates are updated.

13. The inter-pattern feature corresponding method according to claim 9 characterized in that a comparison is performed for the distance between the first feature point of each feature point group arrangement and a second proximity feature point that is closely located to the feature point group arrangement and the shift in the feature point direction of the second proximity feature point to the first feature point with respect to the corresponding feature point group arrangement candidates, the proximity feature points that correspond to each other are added to the corresponding feature point group arrangement candidates, and the corresponding feature point group arrangement candidates are updated.

14. The inter-pattern feature corresponding method according to claim 9 characterized in that a check to an accompanying corresponding feature point candidate of the updated corresponding feature point group arrangement candidate is performed to the corresponding feature point candidates in which one to one characteristic is not met.

15. The inter-pattern feature corresponding method according to claim 9 characterized in that the check to the accompanying corresponding feature point candidate of the updated corresponding feature point group arrangement candidate is based on the correspondence relationship of the proximity feature point of the corresponding feature point candidate.

16. The inter-pattern feature corresponding method according to claim 9 characterized in that the check to the corresponding feature point group arrangement candidate is based on the number of the accompanying corresponding feature points of the corresponding feature point group arrangement candidate.

17. A non-transitory computer readable medium embodying a program which allows a central processing unit in an inter-pattern feature corresponding device with which inter-pattern features correspond to each other by using feature point information of a pattern to perform a process is characterized by including the processes of:

a first process in which N (N is an integer of two or more) feature points that are closely located to each other in an inputted pattern signal are set as a proximity feature point group, the proximity feature point group and an arrangement relationship numerical value group representing an arrangement relationship between the feature points of the proximity feature point group are set as a feature point group arrangement, and at least one of these is generated, a second process in which a comparison of the arrangement relationship numerical value of a first pattern with the arrangement relationship numerical value of a second pattern that are generated in the first process is performed to detect corresponding feature point group arrangement candidates that correspond to each other, a third process in which a comparison of the arrangement relationship numerical values related to the feature point of each feature point group arrangement and the feature point that is closely located to the feature point group arrangement is performed with respect to the corresponding feature point group arrangement candidates, the proximity feature points that correspond to each other are added to the corresponding feature point group arrangement candidates, respectively and the corresponding feature point group arrangement candidates are updated, a fourth process in which an accompanying corresponding feature point candidate of the corresponding feature point group arrangement candidate updated in the third process is checked to determine an accompanying corresponding feature point of the corresponding feature point group arrangement candidate, and a fifth process in which the corresponding feature point group arrangement candidates are checked to determine the corresponding feature points that correspond to each other between the patterns.

\* \* \* \* \*